United States Patent [19]
Okabe

[11] Patent Number: 5,864,527
[45] Date of Patent: Jan. 26, 1999

[54] RECORDING AND REPRODUCING APPARATUS FOR DATA STORAGE AND/OR AUDIO

[75] Inventor: Masanobu Okabe, Kanagawa, Japan

[73] Assignee: Sony Corporation, Tokyo, Japan

[21] Appl. No.: 660,712

[22] Filed: Jun. 10, 1996

Related U.S. Application Data

[63] Continuation of Ser. No. 537,986, Oct. 2, 1995, abandoned, which is a continuation of Ser. No. 163,663, Dec. 7, 1993, abandoned.

[30] Foreign Application Priority Data

Dec. 15, 1992 [JP] Japan ................................ 4-354541

[51] Int. Cl.⁶ ........................................ G11B 7/00
[52] U.S. Cl. .......................... 369/58; 369/54; 369/48
[58] Field of Search ........................ 360/60; 369/54, 369/58, 47, 48, 49, 50, 124

[56] References Cited

U.S. PATENT DOCUMENTS

| | | | |
|---|---|---|---|
| 4,796,100 | 1/1989 | Sakaguchi | 369/48 |
| 5,224,087 | 6/1993 | Maeda et al. | 369/54 |
| 5,268,889 | 12/1993 | Furukawa et al. | 369/47 |
| 5,293,566 | 3/1994 | Satoh et al. | 369/49 |
| 5,315,570 | 5/1994 | Miura et al. | 369/58 |

FOREIGN PATENT DOCUMENTS

| | | | |
|---|---|---|---|
| 0391588A3 | 10/1990 | European Pat. Off. | G11B 23/03 |
| 0436877A3 | 7/1991 | European Pat. Off. | G11B 7/00 |
| 0453108A3 | 10/1991 | European Pat. Off. | G11B 19/02 |
| 1294276 | 11/1989 | Japan | G11B 20/10 |
| 3207051 | 9/1991 | Japan | G11B 19/12 |
| 4061666 | 2/1992 | Japan | G11B 20/10 |
| 4229479 | 8/1992 | Japan | G11B 33/10 |
| 4079047 | 12/1992 | Japan | G11B 11/10 |

*Primary Examiner*—Paul W. Huber
*Attorney, Agent, or Firm*—Limbach & Limbach L.L.P.

[57] ABSTRACT

The data disc type can be discriminated in utilizing a part of control information or using through holes of disc cassette, and even in the case where the magneto-optical disc is loaded erroneously, the desired data can be recorded/reproduced on the corresponding disc selectively by shifting the operation as occasion demands. And thus, even in the case where this type of magneto-optical disc is used for data recording, the magneto-optical disc device and the magneto-optical disc which are capable of simplifying the disc control can be obtained.

7 Claims, 16 Drawing Sheets

| | 16 BIT EVEN M | | 16 BIT ODD M | | | |
|---|---|---|---|---|---|---|
| | MSB WmB LSB | MSB WmA LSB | MSB WmB LSB | MSB WmA LSB | | |
| | d1 d8 | d1 d8 | d1 d8 | d1 d8 | | |
| 0 | 00000000 | 11111111 | 11111111 | 11111111 | | HEADER |
| 1 | 11111111 | 11111111 | 11111111 | 11111111 | | |
| 2 | 11111111 | 11111111 | 11111111 | 00000000 | | |
| 3 | CLUSTER H | CLUSTER L | 00000000 | 00000010 | | |
| 4 | 00000000 | 00000000 | 00000000 | 00000000 | | |
| 5 | 00000000 | 00000000 | 00000000 | 00000000 | | |
| 6 | "M" | "I" | "N" | "X" | | |
| 7 | DISC TYPE | LASER POWER ON RECORDING MODE | FIRST TNO | LAST TNO | | |
| 8 | READ-OUT START ADDRESS | | | USED SECTORS | | |
| 9 | POWER CAL AREA START ADDRESS | | | 00000000 | | |
| 10 | U-TOC START ADDRESS | | | 00000000 | | |
| 11 | RECORDABLE USER AREA START ADDRESS | | | 00000000 | | DATA AREA (2336 BYTE) |
| 12 | 00000000 | P-TNO 1 | P-TNO 2 | P-TNO 3 | | |
| 13 | P-TNO 4 | P-TNO 5 | P-TNO 6 | P-TNO 7 | | |
| ≈ | ≈ | ≈ | ≈ | ≈ | | |
| 74 | P-TNO 248 | P-TNO 249 | P-TNO 250 | P-TNO 251 | | |
| 75 | P-TNO 252 | P-TNO 253 | P-TNO 254 | P-TNO 255 | | |
| 76 | 00000000 | 000000000 | 00000000 | 00000000 | | |
| 77 | 00000000 | 00000000 | 00000000 | 00000000 | | |
| 78 | START ADDRESS (TRACK 1) | | | TRACK MODE | | |
| 79 | END ADDRESS | | | 00000000 | | |
| ≈ | ≈ | | | ≈ | | |
| 586 | START ADDRESS (TRACK 255) | | | TRACK MODE | | |
| 587 | END ADDRESS | | | 00000000 | | |

FIG. 9

|   | 16 BIT EVEN M | | 16 BIT ODD M | |
|---|---|---|---|---|
|   | MSB  WmB  LSB<br>d1          d8 | MSB  WmA  LSB<br>d1          d8 | MSB  WmB  LSB<br>d1          d8 | MSB  WmA  LSB<br>d1          d8 |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | MAKER CODE | MODEL CODE | FIRST TNO | LAST TNO |
| 8 | 00000000 | 00000000 | 00000000 | USED SECTORS |
| 9 | 00000000 | 00000000 | 00000000 | 00000000 |
| 10 | 00000000 | 00000000 | 00000000 | DISC SERIAL NO |
| 11 | DISC • ID | | P-DFA | P-EMPTY |
| 12 | P-FRA | P-TNO 1 | P-TNO 2 | P-TNO 3 |
| 13 | P-TNO 4 | P-TNO 5 | P-TNO 6 | P-TNO 7 |
| ≈ | ≈ | ≈ | ≈ | ≈ |
| 74 | P-TNO 248 | P-TNO 249 | P-TNO 250 | P-TNO 251 |
| 75 | P-TNO 252 | P-TNO 253 | P-TNO 254 | P-TNO 255 |
| 76 | 00000000 | 000000000 | 00000000 | 00000000 |
| 77 | 00000000 | 00000000 | 00000000 | 00000000 |
| 78 | START ADDRESS | | | TRACK MODE |
| 79 | END ADDRESS | | | LINK-P |
| ≈ | ≈ | | | ≈ |
| 586 | START ADDRESS | | | TRACK MODE |
| 587 | END ADDRESS | | | LINK-P |

Rows 0–3: HEADER. Rows 4–587: DATA AREA (2336 BYTE).

FIG. 14

RECORDING AND REPRODUCING APPARATUS FOR DATA STORAGE AND/OR AUDIO

This is a continuation of application Ser. No. 08/537,986 filed on Oct. 2, 1995 (now abandoned); which is a continuation of application Ser. No. 08/163,663 filed on Dec. 7, 1993 (now abandoned).

BACKGROUND OF THE INVENTION

1. Field of the Invention

This invention relates to magneto-optical disc recording/reproducing devices and, more particularly, to a magneto-optical recording/reproducing device which detects an incorrect type of disc loaded into it and, responsive thereto, prohibits a recording/reproduction operation.

Some conventional magneto-optical disc devices are capable of recording compressed audio data on a compact magneto-optical disc utilizing thermal magnetic recording.

As shown in FIG. 1, in such a prior art magneto-optical disc device 1, an audio signal AI is inputted successively and is converted into digital signal at an analog-to-digital converter (A/D) 2.

The converted digital signal is audio compression processed at an audio compandor 3 (to decrease the quantity of data) to form audio data DAI.

The magneto-optical disc device I stores this audio data DAI in a memory circuit 5, through a memory controller 4, and outputs the audio data DAI successively to a data processing circuit 6.

The data processing circuit 6 divides the audio data to be outputted successively from a memory circuit 7 into prescribed blocks and forms error correction codes. Then, the data processing circuit 6 modulates the data with a modulation method suitable for magneto-optical disc recording to form recording data, and outputs the resultant recording data to a magnetic head driving circuit 8.

The magneto-optical disc device I controls the overall operations with a system control circuit 11, to rotate a magneto-optical disc 10 at a prescribed revolution speed via a servo circuit 12.

Furthermore, the magneto-optical disc device 1 drives a thread unit 13 via the servo circuit 12 and thus, transfers a magnetic head 9 signal and an optical head 14 signal to prescribed recording tracks of the magneto-optical disc 10.

The magneto-optical disc device 1 drives the magnetic head 9 corresponding to the recording data and impresses the modulation magnetic field formed by the magnetic head 9 to a desired recording track of the magneto-optical disc 10.

Under these conditions, in the magneto-optical disc device 1, an optical beam is irradiated from the optical head 14 to the part of the disc impressed with the modulation magnetic field and thus, by applying the method of thermal magnetic recording, audio data is recorded with high density.

Furthermore, the magneto-optical disc device 1 detects the reflection light of this optical beam at the optical head 14 and outputs the detection result to an address decoder 16 via an amplifier 15 and, thus, detects the address information which was previously recorded on each track.

Wobbling pre-groove is also pre-recorded on the disc. This wobbling is FM modulated so as to record the address information into the whole disc.

Thus, in the magneto-optical disc device 1, audio data can be recorded successively on desired recording tracks depending upon this detection result of position information.

Furthermore, at this point, in the magneto-optical disc device 1, tracking error signal, focus error signal, etc., from the optical head 14 are reproduced at the amplifier 15 and are outputted to the servo circuit 12. Thus, the desired audio data can be certainly recorded.

At the time of this recording, in the magneto-optical disc device 1, by processing audio data per block at the data processing circuit 6, as shown in FIGS. 2A and 2B, audio data will be recorded per cluster (FIG. 2A).

One cluster is composed of the sub data for 4 sectors and the main data of 32 sectors (FIG. 2B).

When a track jump is detected based on the position information detection result, the magneto-optical disc device 1 stops recording, returning to the former recording track and starts recording audio data from the recording track on which the track jump occurred.

At this point, the magneto-optical disc device 1 again outputs audio data stored in the memory circuit 5 per cluster and thus, the dropout of audio data can be avoided by utilizing the memory circuit 5 as a buffer memory. Even in the case where the entire magneto-optical disc device 1 failed to write data due to vibrating, etc., audio signals can be recorded successively.

On the other hand, during reproduction, the magneto-optical disc device 1 decreases the quantity of light of optical beam to be outputted from the optical head 14, as compared to during recording. By detecting changes of polarized wave plane of reflection light obtained from the magneto-optical disc 10, the magneto-optical disc device reproduces the recording data of magneto-optical disc 10 by utilizing the Kerr effect.

The magneto-optical disc device 1 demodulates the output signal of the amplifier 15 at the data processing circuit 6 and processes error correction, then outputs the demodulated, error-corrected, data to the memory controller 4.

At this point, the magneto-optical disc device 1 outputs the audio data SDO reproduced by utilizing the memory circuit 5 as the buffer memory in the same manner as when recording. The audio compandor 3 audio expands the data.

With this arrangement, the magneto-optical disc device 1 demodulates the audio data SDO to digital audio signal AO at this audio compandor 3 and outputs in the form of analog signal via a digital-to-analog converter 16.

Furthermore, during reproduction, by monitoring sub data, which are added to the main data, the magneto-optical disc device 1 detects the track jump. Audio data will be repeatedly reproduced per cluster from the same track based on this detection result as occasion demands. Thus, even if track jump occurs during reproduction, audio signals can be reproduced avoiding the sound cut in advance.

This type of magneto-optical disc recording/reproducing device is disclosed, for example, in U.S. Pat. No. 5,224,087.

Hereupon, it is considered to be convenient if this type of magneto-optical disc device can be used as an external memory device for storing, e.g., computer data.

In this type of magneto-optical disc device, since data can be accessed randomly, the access time can be shortened.

Also since the memory capacity of magneto-optical discs is large, and they are developed already for audio, the magneto-optical disc itself can be produced easily and in large quantities, and can be supplied at lower cost than the conventional disc.

Also, since the magneto-optical disc can be removed, like floppy discs, it is considered that its usability can be improved, as compared with the hard disc.

However, a magneto-optical disc with recorded audio data may be erroneously loaded onto a magneto-optical disc device for data recording. Conversely, a magneto-optical disc for data recording may be erroneously loaded onto a the magneto-optical disc device for audio reproduction.

Accordingly, if the magneto-optical disc device for audio reproduction is allowed to be used as a data recorder, it has been a problem that the user must be careful as to which particular type of disc device he inserts.

2. Object and Summary of the Invention

In view of the foregoing, an object of this invention is to provide a magneto-optical disc device which is capable of simplifying control of the magneto-optical disc device, even when a magneto-optical disc inserted into the disc device is for recording.

The foregoing object and other objects of this invention have been achieved by provision of a device for recording/reproducing audio data and program data which comprises: an input/output section for audio data; an input/output section for program data; a compandor for extension processing audio data in which the inputted audio data to be connected to the input/output section for audio data is compressed to output; a switching circuit for switching the compandor with input/output section for program data; a discrimination circuit for judging whether the loaded recording medium is for audio or for program; a control section for controlling the switching circuit based on the result of the discrimination circuit.

Further, this invention provides a recording/reproducing device for audio which comprises a judgment section for judging the loaded recording medium, and a control section for controlling the prohibition of recording/reproducing operation when the judgment section judges that the recording medium for data storage is loaded.

Furthermore, this invention provides a recording/reproducing device for data storage which comprises judgment section for judging the loaded recording medium, and a control section for controlling the prohibition of recording/reproducing operation when the judgment section judges that the recording medium for audio is loaded.

The nature, principle and utility of the invention will become more apparent from the following detailed description when read in conjunction with the accompanying drawings in which like parts are designated by like reference numerals or characters.

BRIEF DESCRIPTION OF THE DRAWING

In the accompanying drawings:

FIG. 9 is a schematic diagram for the explanation of the TOC of data disc;

FIG. 14 is a schematic view for the explanation of the U-TOC of audio disc which can be recorded;

DETAILED DESCRIPTION OF THE PREFERRED EMBODIMENTS

Figure 1:
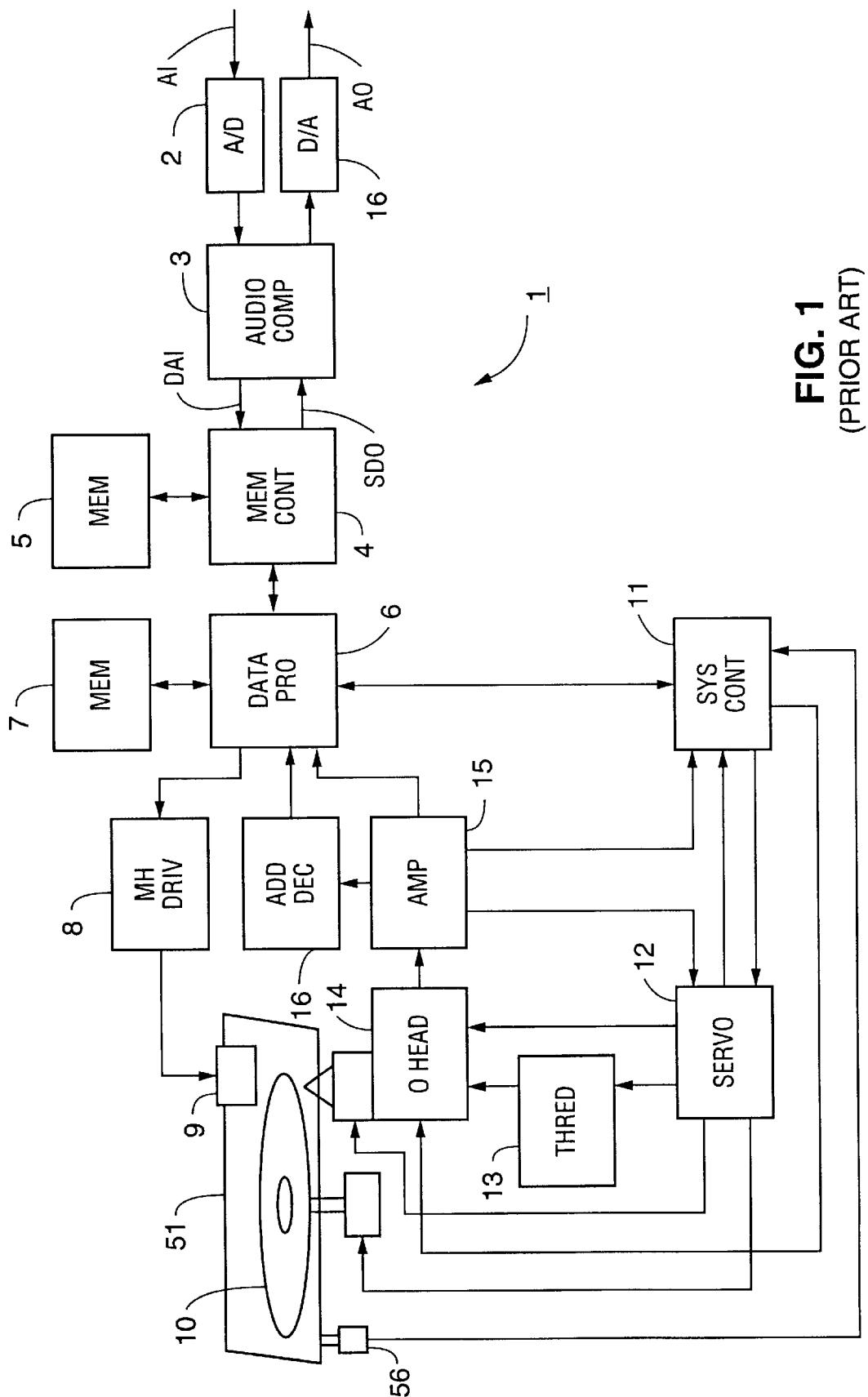
FIG. 1 is a block diagram showing a conventional magneto-optical disc for audio.
Figures 2A, 2B:
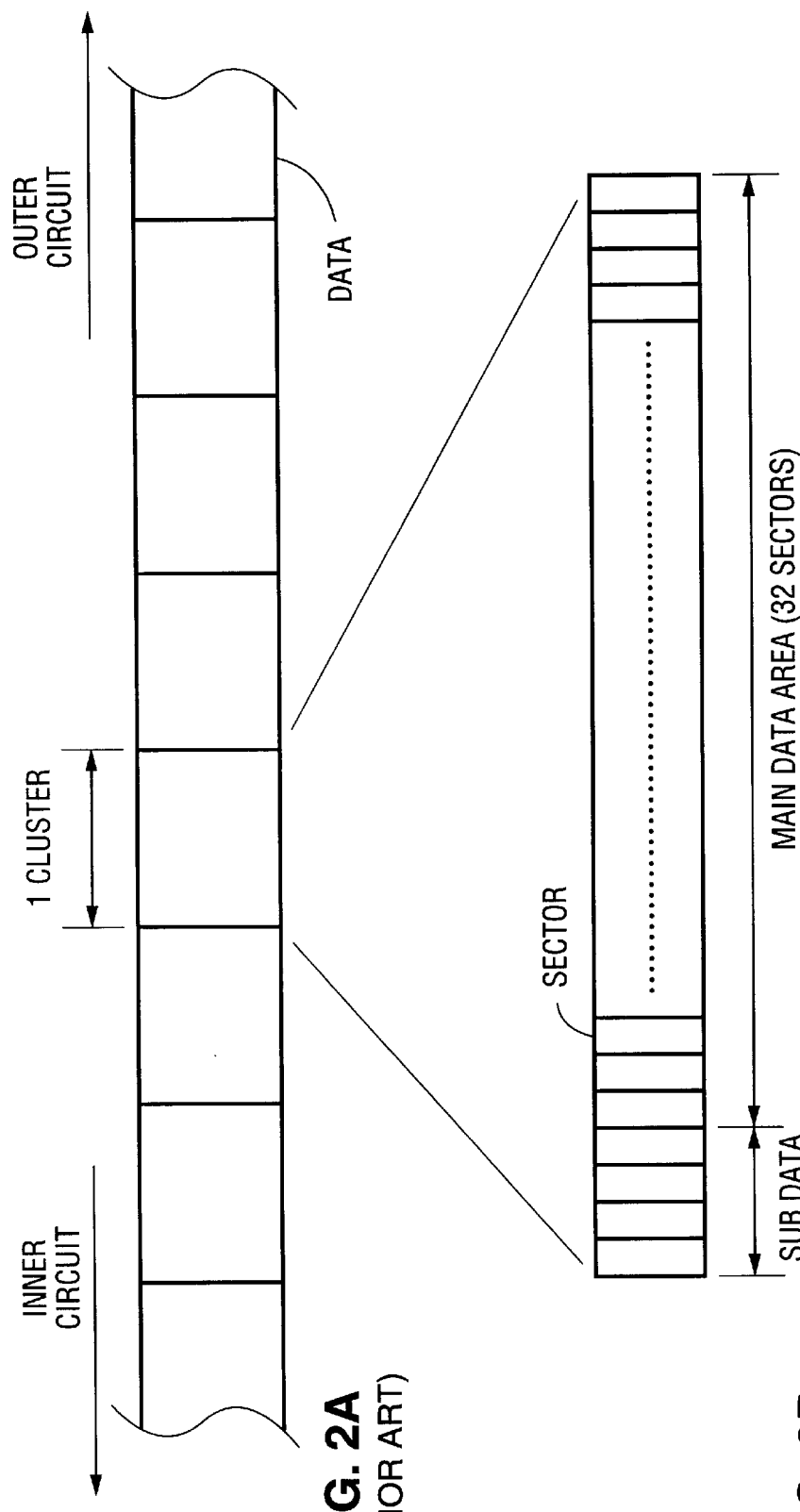
FIG. 2A is a diagram typically showing one cluster unit of data for recording on the disc.
FIG. 2B is a diagram showing a typical detailed data structure of one cluster.

Preferred embodiments of this invention will be described with reference to the accompanying drawings: (1) Data Recording/Reproducing Device A magneto-optical disc device (data recorder 20) for recording computer data will be herein after explained using FIG. 3. Where elements in the device 20 corresponding to the magneto-optical disc device 10 for audio, like reference numerals are employed.

Figure 4:
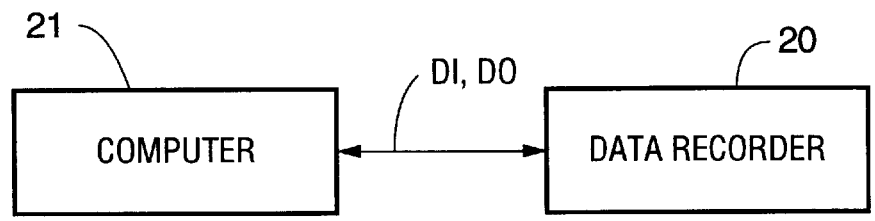
FIG. 4 is a block diagram showing the connection of the disc device of FIG. 3 to a computer.

As shown in FIG. 4, the data recorder 20 serves as the external memory device of a computer 21 by recording or reproducing desired data DI and DO, respectively. More specifically, the data recorder 20 inputs data DI and outputs data DO via the memory controller 22 and uses a memory circuit 5 as buffer memory.

Furthermore, the system control circuit 23 controls the general operations of the data recorder 20 and shifts the general operations of the data recorder 20 responsive to the type of magneto-optical disc 10.

More specifically, there are reproducing discs, for reproduction only, in which pits are formed in the same manner as audio data are recorded (i.e., are "reproduce-only" discs), discs for recording which have a vertical magnetization film on the entire face (i.e., "recordable" discs); and a combined disc which has a reproduce-only zone and recordable zone on the inner circle side and outer circle side, respectively.

Figure 5:
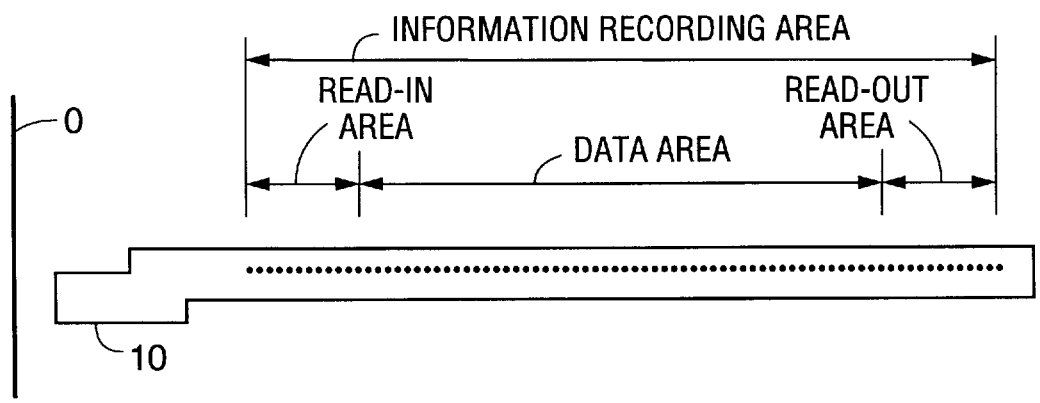
FIG. 5 is a schematic view showing a reproducing disc.
Figure 6:
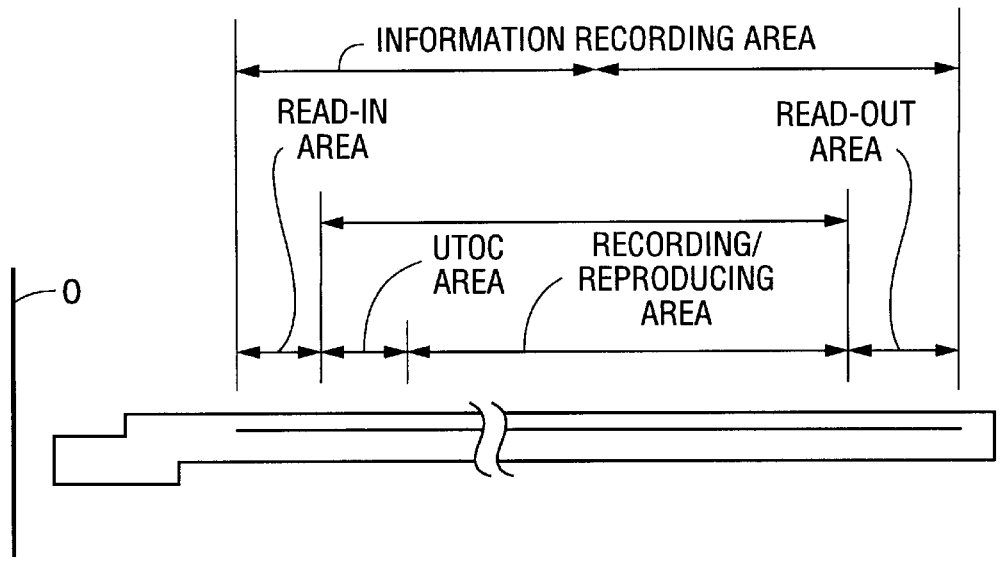
FIG. 6 is a schematic view showing a recording/reproducing disc.
Figure 7:
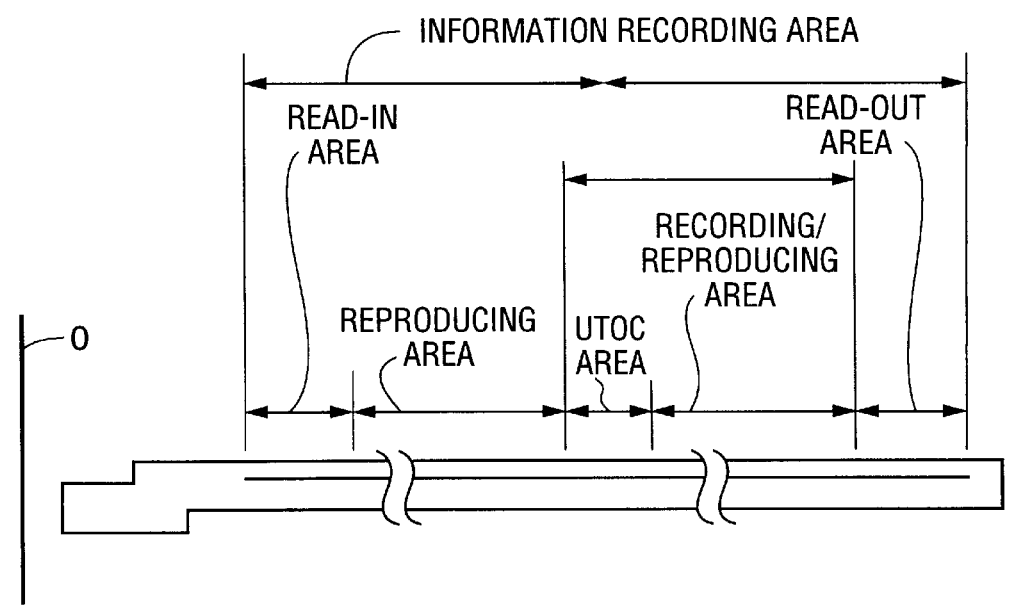
FIG. 7 is a schematic view showing a combined disc.

Schematic diagrams of the three types of discs are shown in FIGS. 5 to 7. A read-in area and a read-out area are formed in the innermost periphery and outermost periphery, respectively, of a concentric circle.

The data recorder 20 is for reproducing data from a reproduce-only magneto-optical disc (FIG. 5) which is composed of pits, like an audio compact disc.

Various data, such as data of the outermost circle of the disc, the end of recording zone, etc. is recorded in the read-out area. The control information, which indicates, e.g., the type of the magneto-optical disc 10, is recorded in the read-in area.

Furthermore, on the recordable disk (FIG. 6) and the combined disc (FIG. 7), a User Table of Contents ("UTOC") zone is formed in the inner circle side of the disc.

When the magneto-optical disc 10 is initially loaded in the data recorder 20, the read-in area is reproduced and the type of magneto-optical disc 10 is determined therefrom. Necessary processing can be performed by the data recorder in accordance with the type of disc 10.

Figure 8:
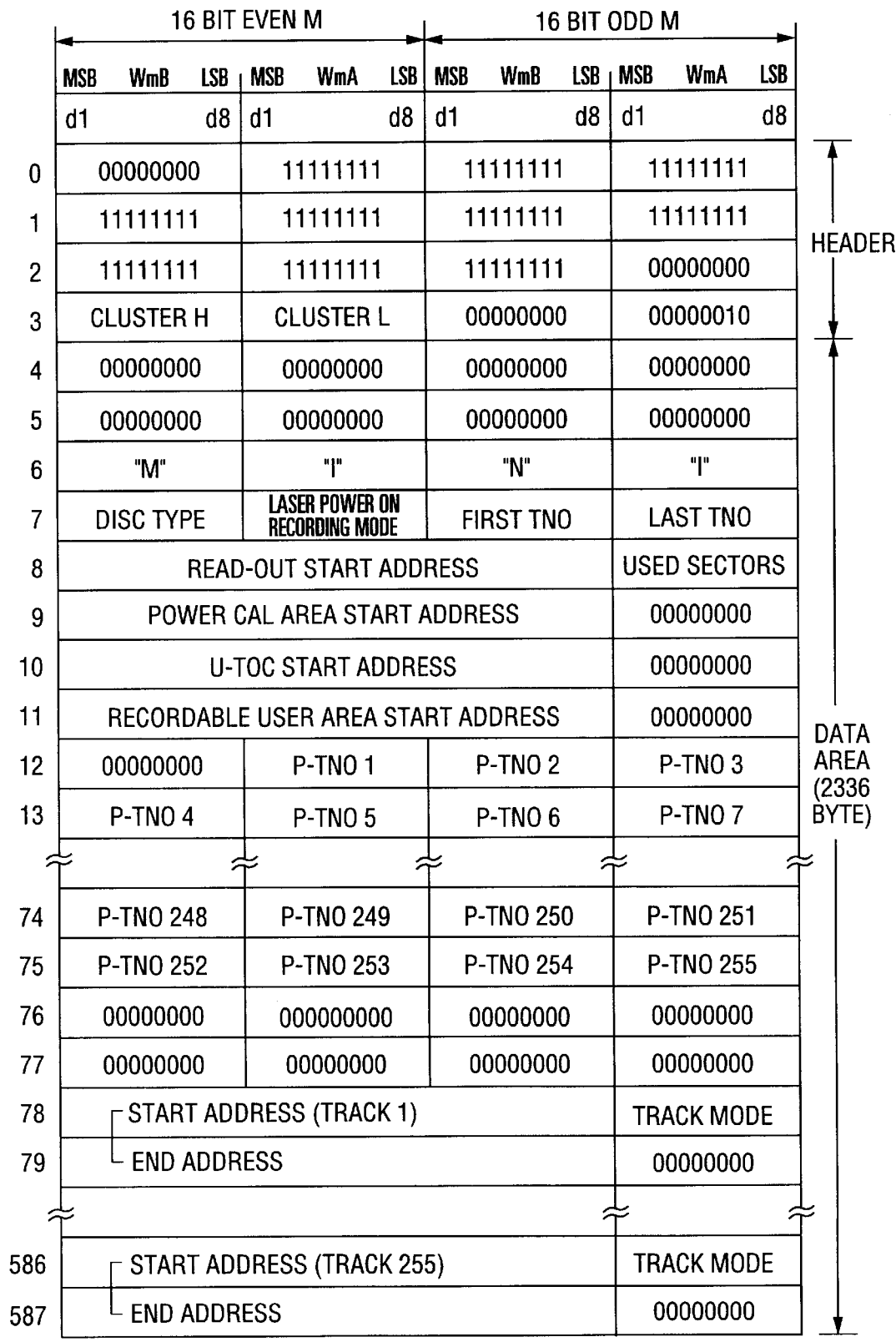
FIG. 8 is a schematic view for the explanation of the TOC of audio disc only for reproduction.

More specifically, in the magneto-optical disc 10, a Table of Contents ("TOC") recorded as control data is formed on this read-in area, and the TOC data assigned to the sector "0" is defined by the TOC data table as shown in FIGS. 8 and 9. In these TOC data tables, a 16-byte header is shown at address (0)–(3) in a longitudinal direction will be allocated to the header. Areas at address (4) and over are allocated to the main data.

The 8 byte data at address (4)–(5) is prescribed data defined by the format.

Data for judging whether the disc is a magneto-optical disc for music is at address (6). (Hereinafter, the disc for music is called as "audio disc", and a magneto-optical disc for data other than music is called a "data disc".) More specifically, in the 4 byte data at address (6), the type of the magneto-optical disc 10 is recorded by using ASCII ("American Standard Code for Information Interchange") code, a character code "MINI" (FIG. 8) is recorded for the audio disc, and a character code "MINX" (FIG. 9) is recorded for the data disc. With this arrangement, the data recorder 20 can read the character code and can discriminate between an audio disc and a data disc.

In addition, the 16 byte data at address (7)–(11) indicates the disc type and the quantity of light to be used at recording (i.e., laser power on recording mode). On a recordable disc and on a combined disc, the address recording area (first TNO, last TNO) will also be recorded. Thus, the data recorder 20 can use the control data to selectively record audio or data.

Figure 10:
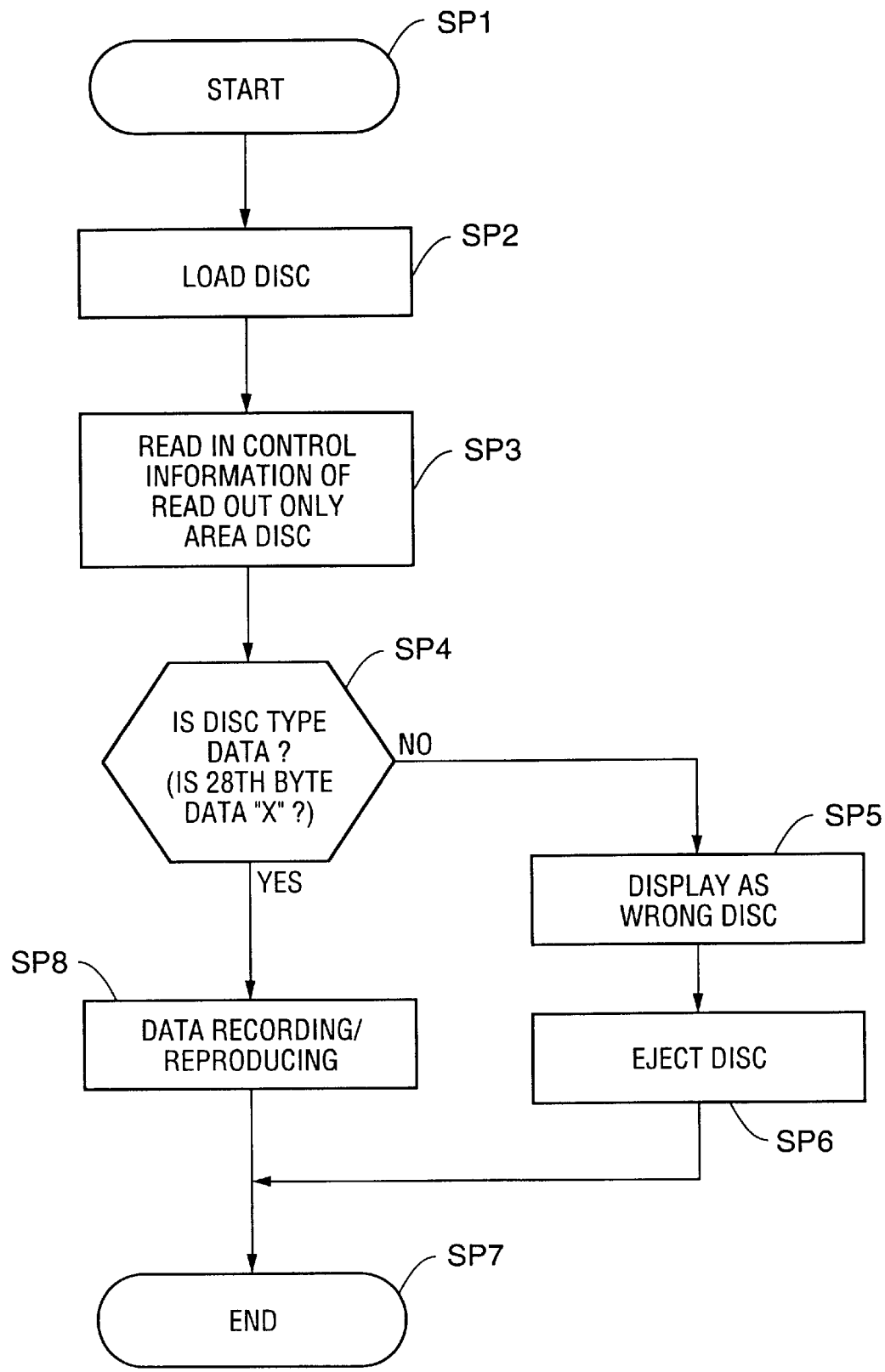
FIG. 10 is a flowchart for the explanation of the operation of data recorder.

With this arrangement, when the magneto-optical disc 10 is loaded, the data recorder 20 reproduces this read-in area and performs the processing procedure as shown in FIG. 10, as discussed in detail below. If an audio disc is erroneously loaded, the data recorder 20 does not perform a recording/reproducing operation.

In the data recorder 20, the system control circuit 23 enters into the procedure from the step SP1 to step SP2 when electric power is supplied. When a magneto-optical disc 10 is loaded, the system control circuit proceeds to the step SP3.

Here, the system control circuit 23 controls the servo circuit 12 to transfers the optical head 14 to the read-in area, and then reproduces this read-in area and inputs TOC data.

Then, the system control circuit 23 proceeds to the step SP4 and, here, by judging whether the character code of the 28th byte in TOC data table is (X) character code judges whether the magneto-optical disc 10 loaded is a data disc.

At this point, if a negative result is obtained at step SP4, the system control circuit 23 proceeds to the step SP5 and shows that a non-data disc is erroneously loaded through a prescribed display. Then, at step SP6, the magneto-optical disc is ejected and at step SP7 the processing procedure is terminated.

With this arrangement, the data recorder 20 can detect the erroneous loading of the audio disc by referring to the control information of the magneto-optical disc. For example, erroneous elimination of audio data recorded on the audio disc can be preempted.

On the other hand, an affirmative result can be obtained at the step SP4 in the case where a data disc is loaded. In this case, the system control circuit 23 proceeds to the step SP8 and records/reproduces the desired data DI and DO corresponding to the user's operation.

In the case where the magneto-optical disc loaded is a reproduce-only disc, the system control circuit 23 reproduces and outputs the data recorded or this magneto-optical disc corresponding to the user's operation and thus, for example, the data recorder 20 can easily input a program from the reproduce-only disc to the computer 21.

On the other hand, if the magneto-optical disc loaded is a combined disc, the system control circuit reproduces the reproduction only area, and outputs data, responsive to the user's operation and records/reproduces input/output data of the computer 21 in utilizing the recording/reproducing area.

With this arrangement, when the recording/reproducing operation is terminated, the system control circuit 23 proceeds to the step SP7 corresponding to the user's operation and terminates this processing procedure.

(2) Magneto-optical Disc Device for Audio Disc

Figure 11:
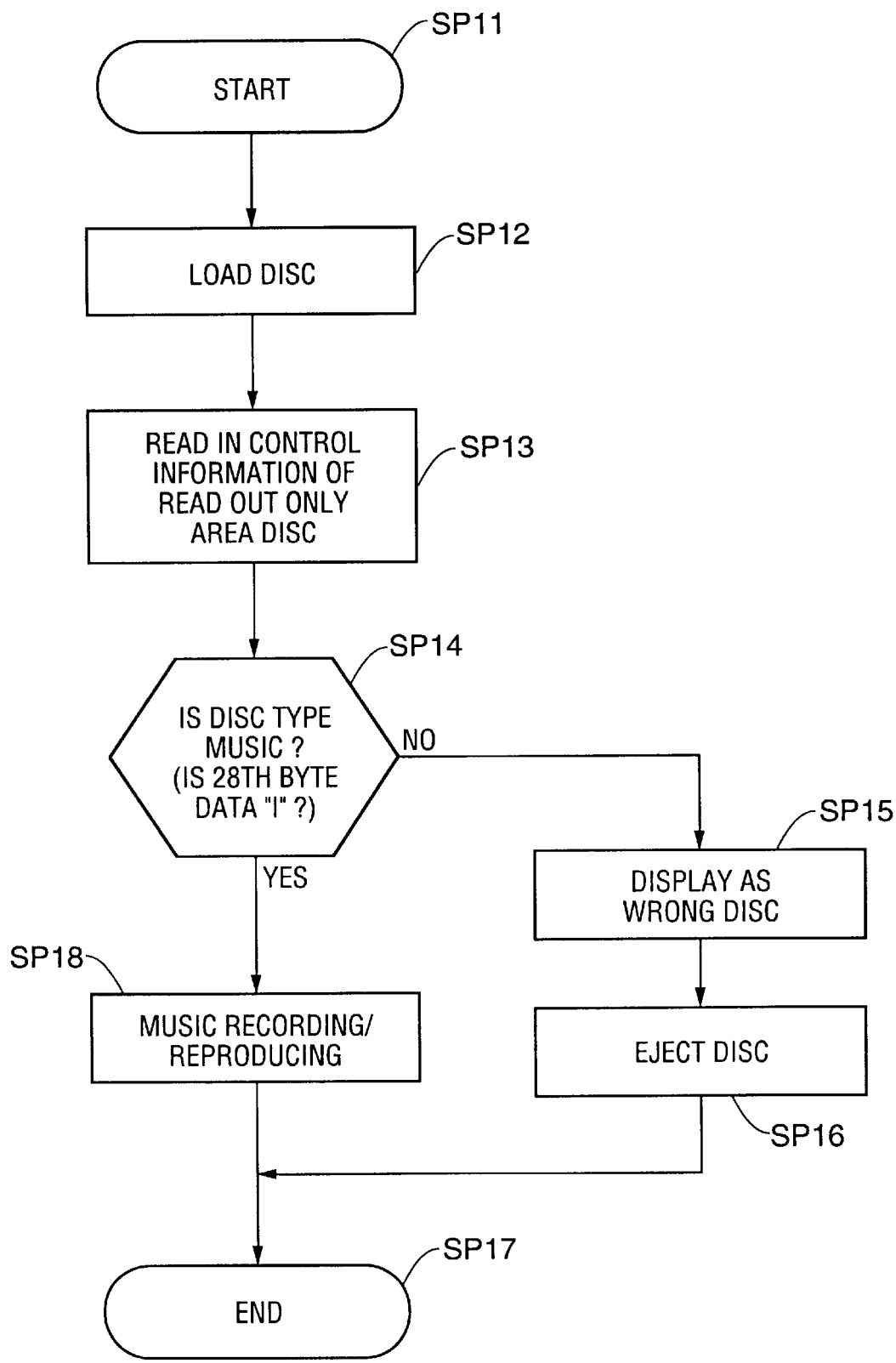
FIG. 11 is a flowchart for the explanation of the operation of magneto-optical disc device for audio disc only.

On the other hand, in a magneto-optical disc device 20 used for recording/reproducing only audio disc, by performing the processing procedure as shown in FIG. 11 at the system control circuit 23, the erroneous elimination of data from the data disc can be pre-empted.

More specifically, in the magneto-optical disc device 20, when the electric source is supplied, the system control circuit 23 enters into this procedure from the step SP11 to the step SP12. If the magneto-optical disc 10 has been loaded at this point, the system control circuit 23 proceeds to the next step SP13.

Here, the system control circuit 23 outputs control data to the servo circuit 12 to transfer the optical head 14 to the read-in area of the loaded disc. The system control circuit 23 then inputs the TOC data from the read-in area and proceeds to the step SP14.

At this point, by judging whether the character code of 28th byte on the TOC data table is character code (I), the system control circuit 23 judges whether the magneto-optical disc 10 loaded is an audio disc. If not, the system control circuit 23 proceeds to the step SP15 and displays that the disc is erroneously loaded.

Then, the system control circuit 23 ejects this magneto-optical disc 10 at the next step SP16 and terminates this processing procedure at the following step SP17.

Thus, in the magneto-optical disc device 20, the erroneously loaded data disc can be detected based on the control information of the magneto-optical disc.

On the other hand, in the case where an audio disc is loaded correctly, since an affirmative result is obtained at the step SP14, the system control circuit 23 proceeds to the step SP18 and records/reproduceS the desired audio signals Al and AO corresponding to the user s operation.

The system control circuit 23 causes the disc device 20 to reproduce digital audio signals recorded on the magneto-optical disc corresponding to the userl s operation in the case where the magneto-optical disc loaded is the reproducing only disc. On the other hand, in the case where the magneto-optical disc loaded is a combined disc, the system control circuit 23 causes the disc device 20 to reproduce audio signals from the reproduction-only area and to record/reproduce audio signals to/from the recording/reproducing area. Finally, in the case where the magneto-optical disc loaded is a recording/reproducing disc, audio signals will be recorded/reproduced on this magneto-optical disc corresponding to the user's operation.

Thus, when this recording/reproducing function is completed the system control circuit 23 proceeds to the step SP17 corresponding to the user's operation and completes this processing procedure.

(3) Combined Magneto-optical Disc Device

If both an audio disc and a data disc can be recorded/reproduced in a single magneto-optical disc device, usability can be improved. Furthermore, such a device may be more cost-effective since there are many circuits which are common to audio disc and data disc devices. Finally, such a dual-purpose device would be more convenient to use than two separate discs.

Figure 12:
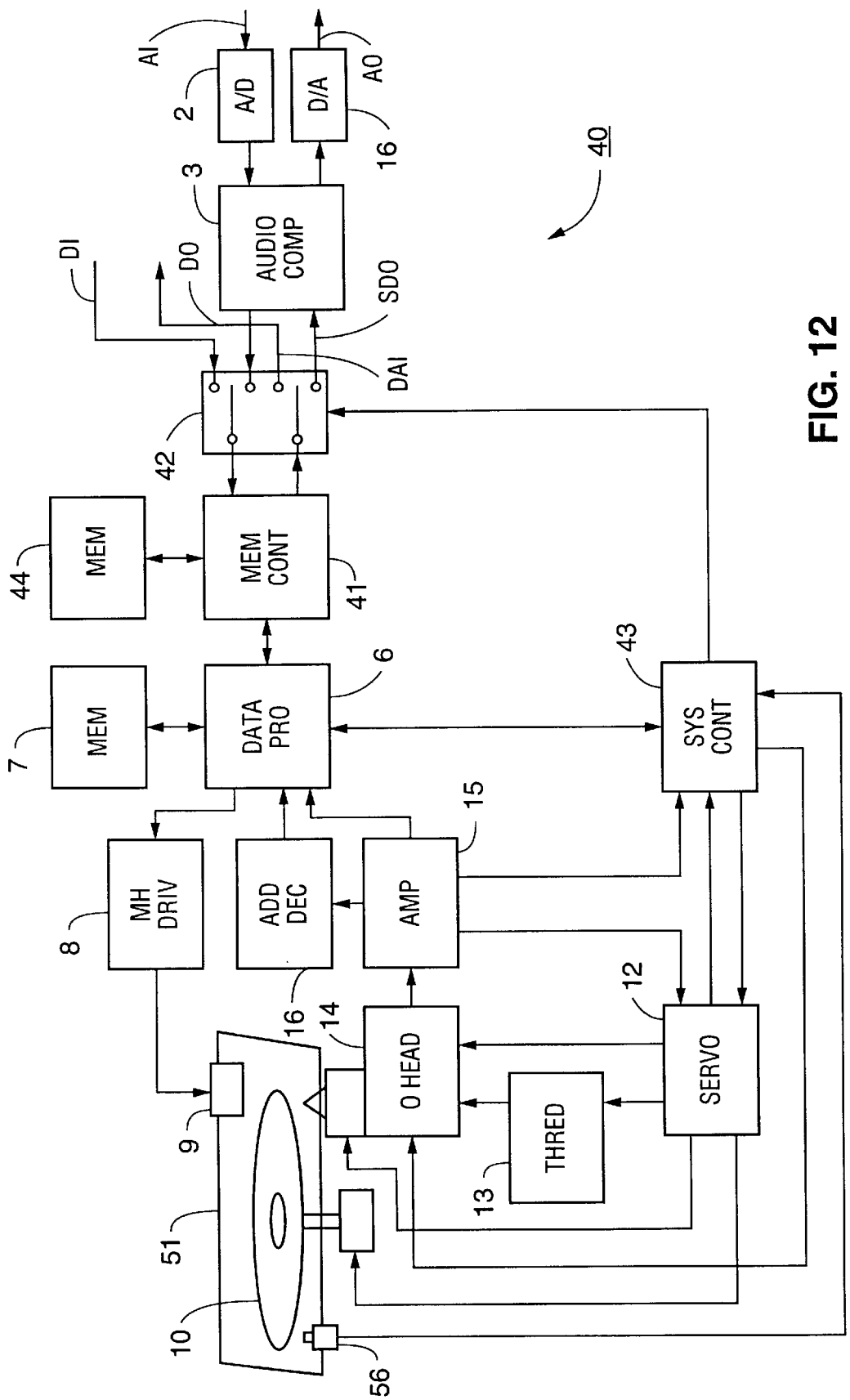
FIG. 12 is a block diagram showing the audio disc and data disc combined magneto-optical disc device.

In the magneto-optical disc device 40 as shown in FIG. 12, the operation can be shifted in accordance with the TOC data table of the magneto-optical disc 10 and thus, both audio disc and data disc can be recorded and reproduced with a single disc device.

More specifically, in the magneto-optical disc device 40, a selector 42 is placed between a memory controller 41 and the audio compandor 3, and the contacts of this selector 42 are selected by the control circuit 43.

With this arrangement, in the case where an audio disc is loaded, the magneto-optical disc device 40 records digital audio signal DAI to be inputted via the audio compandor 3, and reproduces digital audio data SDO to be obtained upon reproducing the magneto-optical disc 10 to the audio compandor 3.

On the other hand, in the case where the magneto-optical disc 10 loaded is a data disc, the magneto-optical disc device 40 records the desired data DI to be inputted from the computer connected to selector 42 and also outputs various data DO to the computer upon reproduction of the data from the data disc.

Furthermore, in the magneto-optical disc device 40, in the case where the magneto-optical disc 10 loaded is an audio disc, sound jump can be avoided by using the memory circuit 44 as a buffer memory for audio data, and on the other hand, in the case where the magneto-optical disc 10 loaded is a data disc, by using this memory circuit 44 as buffer memory of data DO and DI, the data DI can be inputted and the data DO can be outputted with a prescribed transmission speed.

Figure 13:
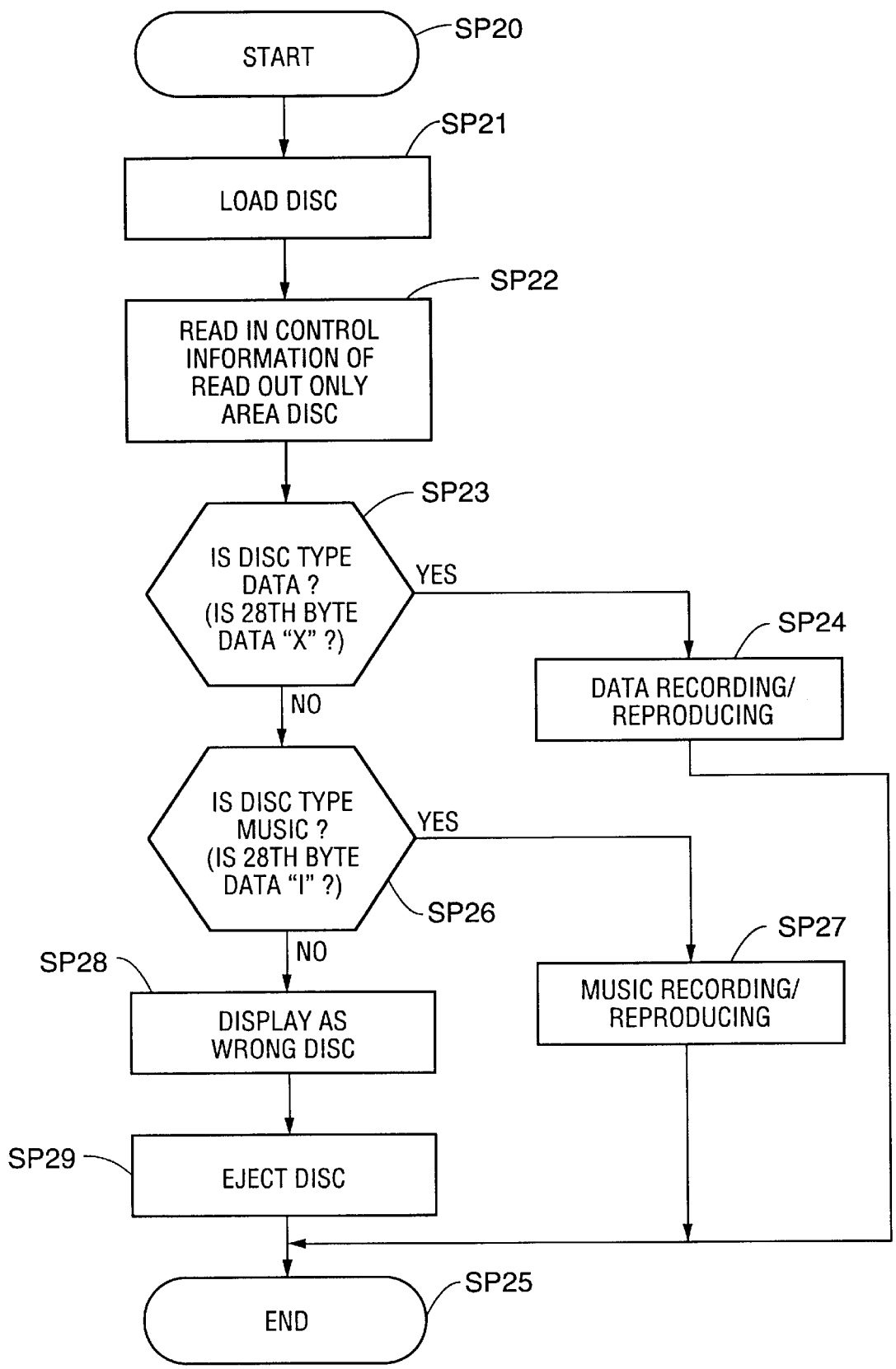
FIG. 13 is a flowchart for the explanation of the operation of audio disc and data disc combined magneto-optical disc device.

In this magneto-optical disc device 40, the system control circuit 43 enters into the processing procedure shown in FIG. 13 from the step SP20 to the step SP21 when the electric source is supplied, and here, if the magneto-optical disc 10 is loaded, the processing procedure moves to the step SP22 and reproduces read-in area and inputs the TOC data.

Then, the system control circuit 43 proceeds to the step SP23, and here, by judging whether the character code of the 28th byte of the TOC data table is the character code (X), judges whether the magneto-optical disc 10 loaded is a data disc. If the disc is a data disc, then the procedure moves to the step SP24.

At this point, the system control circuit 43 outputs control data to the selector 42 to input data DI and to output data DO. In particular, the system control circuit 43 records and reproduces the desired data DI and DO corresponding to the user's operation and if the user operates a stop function key, the system control circuit 43 proceeds to the step SP25 and terminates the processing procedure.

Thus, in the magneto-optical disc device 40, in the case where the data disc is loaded, the operation is shifted in accordance with this data disc and data DO and DI corresponding to this data disc can be recorded and reproduced as occasion demands.

On the other hand, if at step 23 it is determined that the disc 10 is not a data disc, the system control circuit 43 proceeds to the step SP26 and judges whether the magneto-optical disc 10 loaded is an audio disc by determining whether the character code of the 28th byte of the TOC data table is the character code (I).

If the disc 10 is an audio disc, the system control circuit 43 proceeds to the step SP27 and controls the selector 42 to the audio compandor 3 side. Thus, the disc device 40 records and reproduces the desired audio signals AI and AO corresponding to the user's operation.

Then, when the user operates the stop operation key, proceeds to the step SP25 and terminates the processing procedure.

On the other hand, if at the step SP26 it is determined that the disc 10 is not an audio disc (i.e., the magneto-optical disc is judged as other than prescribed disc), the system control circuit 43 proceeds to the step SP28 and, after showing that a disc of other than a prescribed type one is erroneously loaded, via the prescribed display, the system control circuit 43 causes the disc device 40 to eject this magneto-optical disc at the next step SP29, and processing is terminated at step SP25.

According to the construction as shown in FIG. 12, by discriminating between a data disc and an audio disc by utilizing the control information from the disc and shifting the operation of the disc device 40, both data discs and audio discs can be recorded and/or reproduced. Thus, the control of the magneto-optical disc can be simplified and the usability can be improved.

(4) Discrimination by UTOC

As discussed with reference to FIG. 14, a magneto-optical disc device may judge whether a magneto-optical disc is an audio disc by referring to the UTOC data table formed in the UTOC area of the magneto-optical disc, and thus records/reproduces the corresponding magneto-optical disc selectively.

In the magneto-optical disc (FIGS. 5 to 7) described above, the UTOC area is formed on an inner circle side of the information recording area. FIG. 14 shows the format of the UTOC data table.

In the UTOC data table, as well as in the TOC data table, the header comes first. Subsequently, when the prescribed data area is formed, the UTOC data area is up-dated. At the time of recording/reproducing, the construction of the recording/reproducing area can be detected.

More specifically, in the UTOC data table, pointers to the file addresses are recorded in the recording/reproducing area, stored at address (12)–(75). The addresses of the recording areas of the file are recorded at address (78)–(587).

In this UTOC data table, the disc is labelled as an audio disc (or otherwise) at the 4th bit (shown by (1) underlined in FIG. 14) of the 4th byte of the header, and when it is an audio disc or data disc, this 4th bit of the fourth byte is set to the logic (0) or logic (1), respectively.

Thus, the magneto-optical disc is able to judge whether the disc is an audio disc by first setting this 4th bit data d4 in accordance with the data recorded in the recording/reproducing area. Also, an indication of this judgment can be provided to the user.

According to this embodiment, in the data recorder, the magneto-optical disc device for audio disc and the combined type magneto-optical disc device, the recording/reproducing operation is shifted in the same manner as in the case of using TOC data from the TOC data table, and thus, audio data or data other than audio data is recorded and reproduced on and from the magneto-optical disc.

(5) Discrimination by Disc Cassette

In this embodiment the disc type is discriminated by the disc cassette used to store the recording medium of the magneto-optical disc 10.

Figure 15:
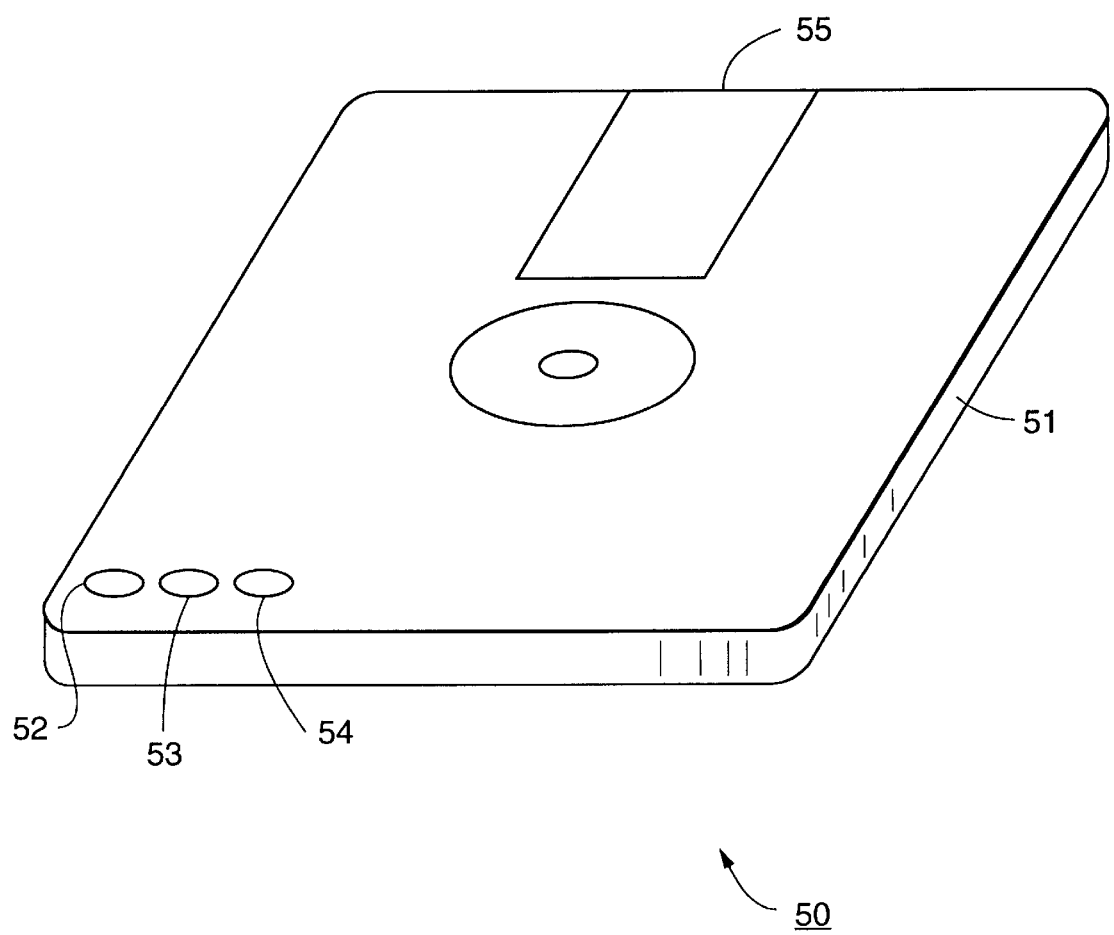
FIG. 15 is a perspective view illustrating a disc cassette.

More specifically, as shown in FIG. 15, this type of magneto optical disc 50 is housed in a disc cassette 51. By opening a shutter 55 and irradiating an optical beam through a window formed on the disc cassette 51 and simultaneously impressing a prescribed modulation magnetic field, desired information can be recorded on a disc shaped recording medium stored within the disc cassette 51.

Through-holes 52 to 54 are formed on the disc cassette 51. The first through-hole 52, at the outer side of the disc cassette 51, slides on a rib (not shown) and can thus be shifted to an opened state or a closed state, to indicate a write-protected state.

A second through-hole 53 is adjacent to the first through-hole 52. Presence of the through-hole 53 indicates that a rewrite possible disc is stored in this disc cassette 51. Thus, the presence or absence of through-hole 52 indicates the type of disc shaped recording medium within the disc cassette 51.

Furthermore, in the magneto-optical disc 50, a third through-hole 54 can be formed adjacent to the second through-hole 53, to indicate that the disc is a data disc. Thus, the magneto-optical disc device can discriminate between an audio disc and a data disc by detecting the existence of the third through hole 54.

Figure 3:
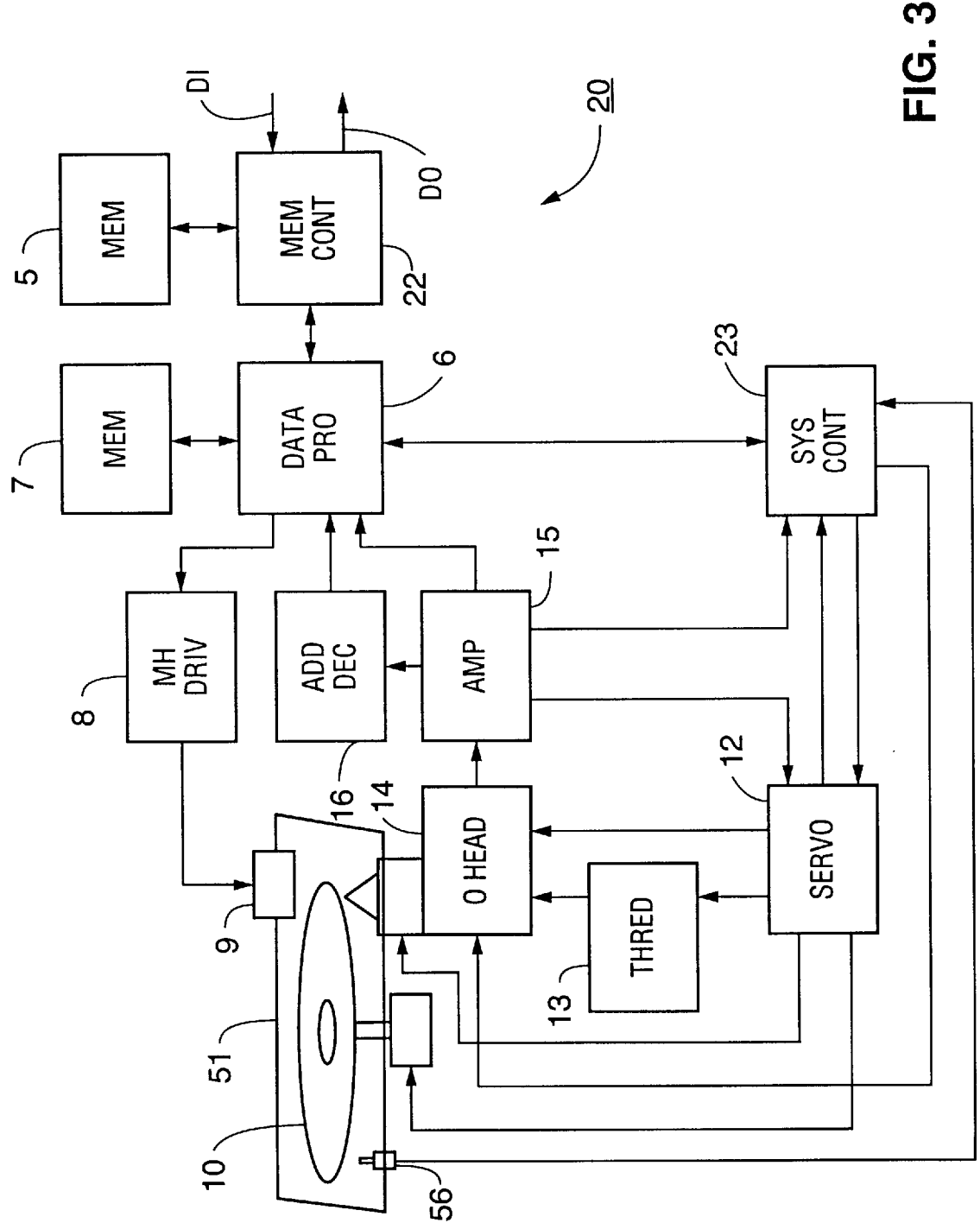
FIG. 3 is a block diagram showing a magneto-optical disc device for recording/reproducing data.

The through-holes are detected by a micro switch 56 (FIGS. 3 and 12). The on/off state of the switch 56 is judged by the system control section 23 (FIG. 3) and 43 (FIG. 12) so as to judge the disc type.

Figure 16:
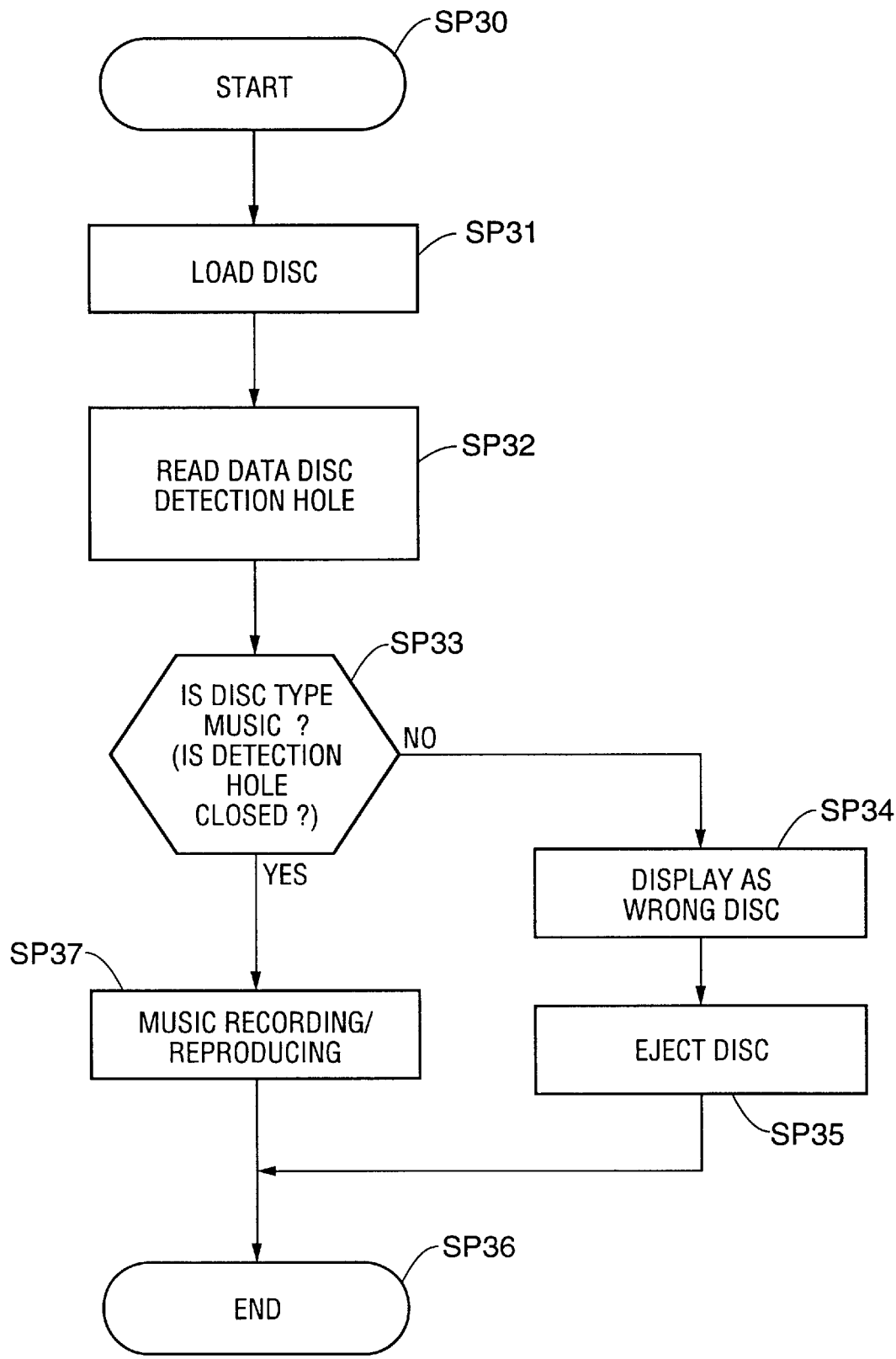
FIG. 16 is a flowchart for the explanation of the operation of magneto-optical disc device for audio disc only.

The magneto-optical disc devices 20 (FIG. 3) and 40 (FIG. 12), for an audio disc only, performs the processing procedure as shown in FIG. 16, recording and reproducing desired data only on an audio disc.

More specifically, the system control units 23, 43 of the magneto-optical disc devices 20 and 40, respectively, enter into the procedure at step SP30. At step SP31, if the magneto-optical disc 50 is loaded, the system control unit 23, 43 proceeds to step SP32. The magneto-optical disc device, by pressing with the tip of the micro switch 56 at the position where the through-hole 54 may be formed, detects whether the through-hole 54 exists. At step SP33, the magneto-optical disc device uses this determination to judge whether the disc is an audio disc.

If not, at step SP32 it is displayed that the disc is erroneously loaded (via the prescribed display) and the magneto-optical disc is ejected at step SP35. Processing is terminated at step SP36.

On the other hand, if it is determined at step SP33 that the disc is an audio disc, processing proceeds at step SP37, where the magneto-optical disc records/reproduces desired audio data in response to an operator's commands, at step SP36, the processing terminates.

Figure 17:
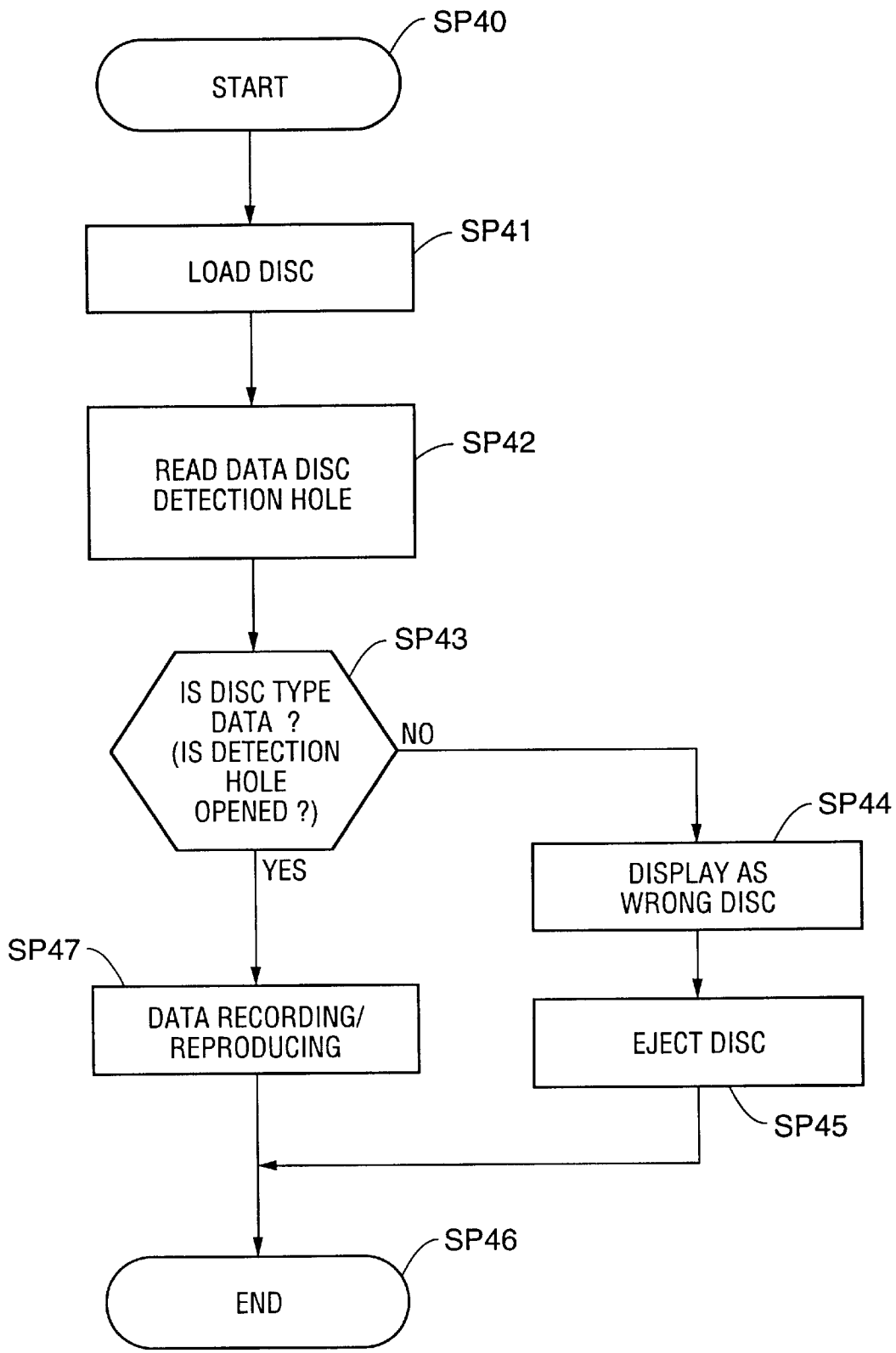
FIG. 17 is a flowchart for the explanation of the operation of data recorder.

On the other hand, the data recorder performs the processing procedure as shown in FIG. 17 to record/reproduce data on only a data disc.

More particularly, the data recorder enters into the procedure from step SP40 and proceeds to step SP41. There, if the magneto-optical disc 50 is loaded, processing proceeds to step SP42.

At this point, the data recorder detects with the micro switch 56, whether a through-hole 54 exists by pressing the point where the through hole 54 may be formed. Then, information on the contact of this micro switch 56 is inputted and processing proceeds to step SP43, where it is judged whether the disc is a data disc.

If not, processing proceeds at step SP44, where it is displayed that the disc is erroneously loaded, via a display. Subsequently, at step SP45, the disc is ejected. Then, at the next stage SP46, processing is terminated.

On the other hand, if it is determined at step SP43 that the disc is a data disc, processing proceeds at step SP47. There, desired audio data is recorded/reproduced responsive to the user's operation. Then, the procedure is terminated at step SP46.

Figure 18:
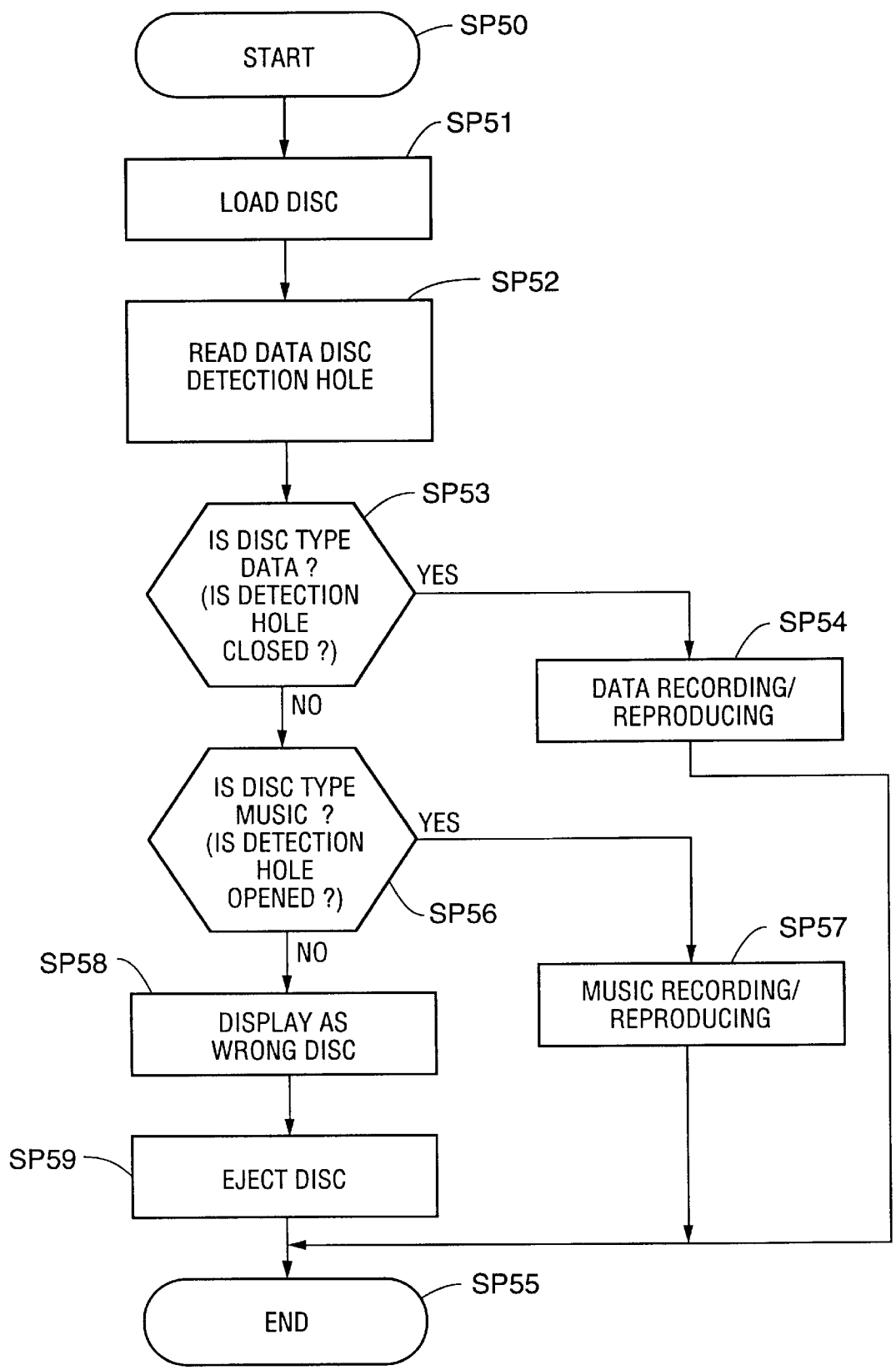
FIG. 18 is a flowchart for the explanation of the operation of audio disc and data disc combined magneto-optical disc device.

On the other hand, a magneto-optical disc device 40 (FIG. 12) which can selectively record/reproduce either audio or data discs, performs the processing procedure shown in FIG. 18. Operation is shifted according to the type of disc 10 inserted therein.

Specifically, the magneto-optical disc device 40 enters into the procedure at step SP50. At step SP51, if the magneto-optical disc 10 is loaded, processing proceeds at step SP52.

At this point, the magneto-optical disc device 40 presses, with the micro switch 56, at the position where the through-hole 54 may be formed, and then, at step SP53, judges from the state of the micro switch 56 whether the disc 10 is a data disc.

If so, processing at step SP54, where the device 40 records/reproduces desired data corresponding to the computer operation. Then, processing ends at step SP55.

If the disc is not a data disc, processing proceeds at step SP56, where it is judged whether the disc is an audio disc. If so, processing proceeds at step SP57.

Here, the magneto-optical disc device 40 records and reproduces the desired audio data corresponding to the user's operation. At step SP55, processing is terminated.

On the other hand, if the disc 10 is not an audio disc, processing moves to the step SP58 where it is displayed that the disc 10 is other than one which the disc device 40 can play. At step SP59, the magneto-optical disc is ejected, and processing is terminated at the next step, step SP55.

(6) Other Embodiments

Furthermore, the embodiments described above concern indicating the disc type by the character codes in the TOC data table and in the UTOC data. However, other discrimination data may also be used.

Furthermore, the embodiments described above displaying an error message and then output the disc, if the wrong type of disc is erroneously loaded. However, the invention may also only output the disc.

Moreover, the embodiments described above concern the case of converting audio signals composed of analog signals into digital signals, and recording/reproducing in the magneto-optical disc device for audio disc only. However, this invention is also widely applicable to the case of recording/reproducing audio data by inputting/outputting the compressed audio data directly.

While the invention has been described in connection with preferred embodiments, it will be obvious to those skilled in the art that various changes and modifications may fall within the true spirit and scope of the invention.

What is claimed is:

1. A recording/reproducing apparatus, comprising:
   a head for reproducing signals from a disc-shaped recording medium loaded into the apparatus and for recording signals into the recording medium;

signal processing means for both performing a specific signal processing of the signals reproduced from the recording medium by said head and for performing a specific signal processing of signals to be recorded onto the recording medium;

an audio compandor for receiving audio signals, from an input audio stream, wherein the received audio signals are said signals to be processed by the signal processing means and recorded into the recording medium, and additionally for providing said signals reproduced from the recording medium and processed by the signal processing means as an output audio stream;

judgement means for judging a type of the recording medium;

first switch means, responsive to the type of the recording medium judged by the judgement means, for selectively providing said signals reproduced from the recording medium and processed by the signal processing means to a data output terminal instead of to the audio compandor; and second switch means, responsive to the type of the recording medium judged by the judgement means, for selectively receiving data signals from a data input terminal as said signals to be recorded into the recording medium instead of said audio signals from the audio compandor.

2. A recording/reproducing apparatus according to claim 1, further comprising:
means for rejecting the loaded recording medium if the type of the recording medium judged by the judgement means is neither an audio disc or a data disc.

3. A recording/reproducing apparatus according to claim 1, wherein the judgement means judges the type of said disc-shaped recording medium responsive to the existence of discrimination holes formed on a cartridge housing the disc-shaped recording medium.

4. A recording/reproducing apparatus according to claim 1, wherein the judgement means judges the type of said disc-shaped recording medium responsive to information recorded previously in a control information area on the recording medium.

5. A recording/reproducing apparatus according to claim 1, further comprising an indication means for indicating a warning when the judgement means judges that other than a recording medium for data storage is loaded.

6. A recording/reproducing apparatus according to claim 4, wherein the information recorded previously in the control information area on said recording medium is a characteristic code.

7. A recording/reproducing apparatus according to claim 4, wherein said characteristic code is "MINI" or "MINX".

* * * * *